United States Patent [19]

Arton et al.

[11] Patent Number: 4,477,805
[45] Date of Patent: Oct. 16, 1984

[54] MATRIX ADDRESSING OF DISPLAY DEVICES

[75] Inventors: Kenneth A. M. Arton, Harlow; George H. S. Rokos, Bishops Stortford, both of England

[73] Assignee: International Standard Electric Corporation, New York, N.Y.

[21] Appl. No.: 270,327

[22] Filed: Jun. 4, 1981

[30] Foreign Application Priority Data

Jun. 19, 1980 [GB] United Kingdom ................. 8020074

[51] Int. Cl.³ .............................................. G09G 3/36
[52] U.S. Cl. .................................... 340/784; 340/719;
340/805; 340/791; 350/330
[58] Field of Search ............... 340/784, 805, 791, 765,
340/718, 719; 350/330, 331, 332, 333

[56] References Cited

U.S. PATENT DOCUMENTS 3,973,254  8/1976  Nomiya et al. ...................... 340/791
4,227,193  10/1980  Shanks ................................ 340/784
4,250,503  2/1981  Shanks ................................ 340/784

Primary Examiner—Marshall M. Curtis
Attorney, Agent, or Firm—T. E. Kristofferson; J. M. May

[57] ABSTRACT

In a matrix array liquid crystal display on silicon with an a.c. drive involving periodic reversal of the potential of the counter-electrode this reversal is liable to produce a significant r.m.s. error voltage at each reversal. The OFF element error voltage is effectively eliminated by blanking all picture elements at the commencement of each reversal, and the ON error voltage more evenly shared by making this reversal occur after a non-integral number of frame scans.

12 Claims, 4 Drawing Figures

MATRIX ADDRESSING OF DISPLAY DEVICES

BACKGROUND OF THE INVENTION

This invention relates to the matrix addressing of display devices and in particular to such devices employing a display mode that exhibits a significant "hysteresis" effect that requires a much larger signal to switch an element ON than is required merely to retain that element ON. One example of such a device is a liquid crystal cell employing the cholesteric nematic phase change.

SUMMARY OF THE INVENTION

According to the present invention there is provided a method of operating a matrix array display device having a set of electrode elements arranged in a matrix array on one side of a layer of display medium and a counter-electrode on the other, wherein each electrode element of the array is repetitively addressed via the gates of a semiconductor device accessed on a coordinate basis via row conductors, wherein the electrode elements of a row are simultaneously accessed and different rows are repetitively strobed so that they are sequentially accessed and the matrix elements thereby repetitively refreshed, wherein regions of the layer of display medium between the counter-electrode and selected electrode elements are rendered visually distinguishable from regions of the layer between the counter-electrode and the remaining electrode elements by the establishment of an r.m.s. potential difference exceeding a threshold value between the counter-electrode and the selected electrode elements while substantially no potential difference is maintained between the counter-electrode and the remaining electrode elements, wherein said potential difference between the counter-electrode and the selected electrode elements is periodically reversed by switching the potential of the counter-electrode between two levels while the potential of the selected electrode elements is switched in substantial antiphase between substantially the same two levels wherein said switching is at a repetition frequency providing a plurality of addressings of each element within the duration of each potential level of the counter-electrode, wherein immediately each time the counter-electrode potential is switched all electrode elements are first simultaneously set to the same potential as the counter-electrode potential and thereafter normal strobing of the electrode elements is resumed.

According to another aspect of the present invention, a matrix display device has a set of electrode elements arranged in a matrix array on one side of a layer of display medium and a counter-electrode on the other. The electrode elements of the array are capable of being accessed on a coordinate basis via column conductors connected to the electrode elements via gates whose operation is controlled by signals applied to row conductors wherein regions of the layer of display medium between the counter-electrode and any selection of electrode elements are capable of being rendered visually distinguishable from regions of the layer between the counter-electrode and the remaining electrode elements by the establishment of an r.m.s. potential difference exceeding a threshold value between the counter-electrode and the selected electrode elements while substantially no potential difference is maintained between the counter-electrode and the remaining electrode elements, which device is provided with drive circuitry adapted to address repetitively the electrode elements of the array of a time-sharing basis via their gates in such a way that the electrode elements of a row are simultaneously accessed and the different rows are repetitively strobed so that they are sequentially accessed and the matrix elements thereby repetitively refreshed, wherein the drive circuitry is adapted to reverse periodically the potential difference between the counter-electrode and the selected electrode elements by switching the potential of the counter-electrode between two levels while the potential of the selected electrode elements is switched in substantial antiphase between substantially the same two levels, wherein said switching is at a repetition frequency providing a plurality of addressings of each element within the duration of each potential level of the counter-electrode and wherein the drive circuitry is adapted to momentarily interrupt the strobing with the commencement of each change of potential of the counter-electrode, and, during said interruption set simultaneously the potential of all electrode elements to the potential of the counter-electrode before normal strobing of the electrode elements is resumed.

BRIEF DESCRIPTION OF THE DRAWING

There follows a description of a preferred embodiment of the invention in its application to the addressing of a dyed cholesteric nematic phase change display cell. The description refers to the accompanying drawings in which.

DETAILED DESCRIPTION OF THE INVENTION

Figure 1:
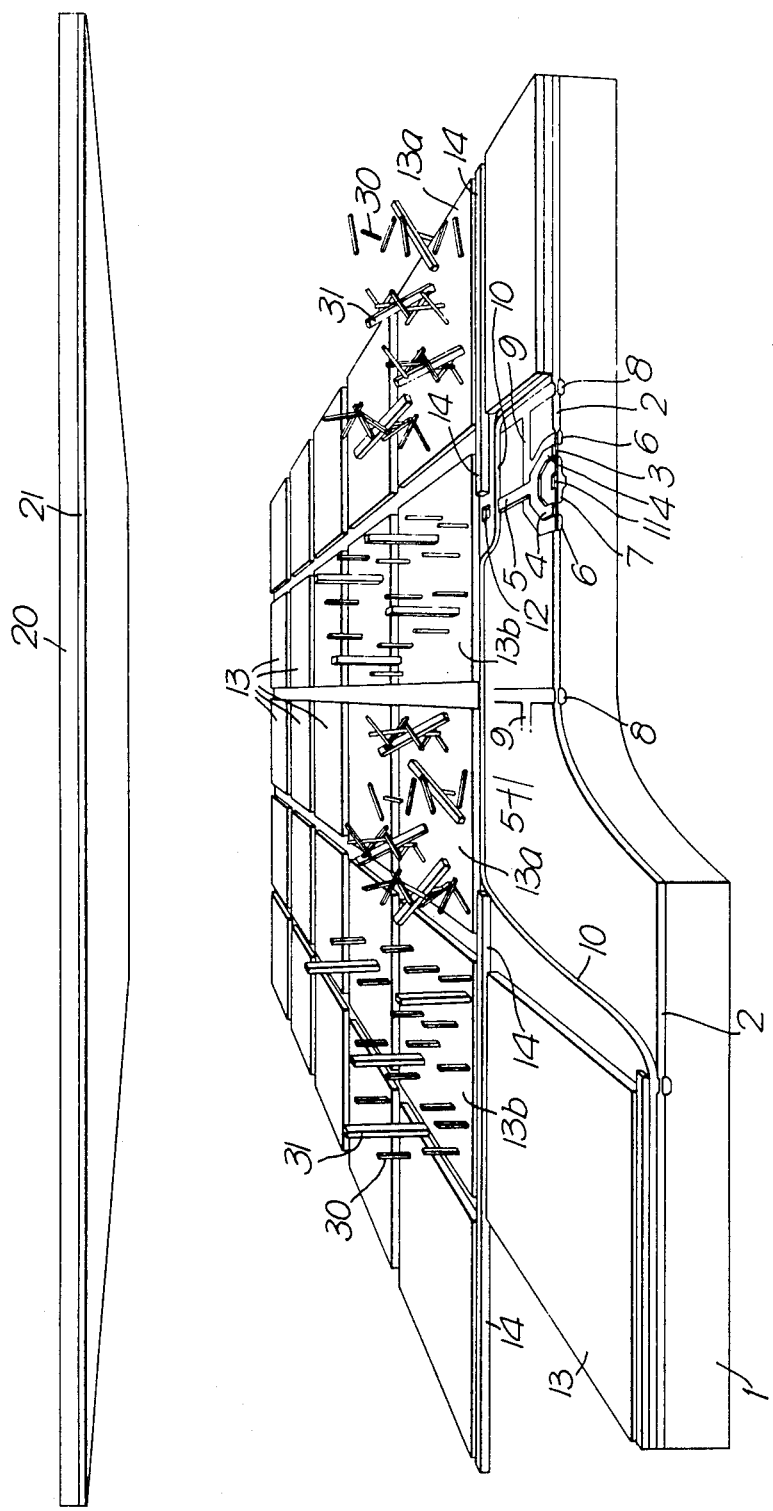
FIG. 1 is a diagrammatic part-sectioned exploded perspective view of the display device.

The display cell consists of a silicon slice 1 and a glass sheet 20 secured together with a perimeter seal (not shown) to form an enclosure for a cholesteric liquid crystal layer to which has been added a pleochroic dye. The liquid crystal molecules are represented in this figure by the smaller bars 30 while the dye molecules are represented by the larger bars 31. The orientations of the bars represent the orientations of the molecules.

Standard coplanar polysilicon MOS n-channel technology is used to form in the silicon slice 1 an array of FET's having source electrodes 6, gate electrodes 4, and drain electrodes 7, with gate oxide 3 and field oxide 2. The source 6 are connected via n-type channels 9 to n-type channels 8 which form column conductors for the array. Similarly the gate electrodes 4 which are formed in polysilicon are connected via polysilicon webs 5 to row conductors 14 through windows 12 in an insulating layer 10. This insulating layer also carries an array of electrode elements 13 which are connected with the FET drains via windows 11.

The electrode elements 13 and a transparent counter-electrode 21 on the glass sheet 20 are covered with a thin insulating layer (not shown) to preclude the possibility of eletrolytic degradation of the liquid crystal layer, and then the insulating layer is covered with an obliquely evaporated layer (not shown) to provide parallel homogeneous molecular alignment of the molecules at the surfaces of the liquid crystal layer.

The liquid crystal layer consists of a positive dielectric anisotropy nematic to which has been added a quantity of pleochroic dye, optionally a quantity of isotropic dye of complementary color, and a chiral additive to give the required cholesteric state in the absence of an applied field. In the absence of this field between the counter-electrode 21 and electrode elements 13a the liquid crystal molecules assume the Grandjean state by virtue of the alignment layers. The axis of the helix is normal to the plane of the layer, and by virtue of the guest-host interaction between the liquid crystal and the pleochroic dye the intervening portions of the layer appear colored. If a field of sufficient magnitude is then applied between the counter-electrode 21 and electrode elements 13b the dielectric anisotrophy causes the liquid crystal molecules to assume homeotropic alignment and the pleochroic dye molecules become similarly aligned. Under these conditions, in the intervening portions of the layer the pleochroic dye should show no color, but by virtue of the finite order paremeter and other effects a residual coloration may be observed. It is this residual coloration that is advantageously tinted out by the addition of an appropriate quantity of isotropic dye of complementary color.

The construction of this cell is described in further detail in the specification of our copending U.S. Pat. application Ser. No. 270,424 filed concurrently herewith.

The display cell is required to be driven with an alternating voltage with zero or small (<50 mV) d.c. component, and with a frequency of not less than about 25 Hz. This is achieved by applying a 25 Hz square wave to the counter-electrode, typically alternating between 0 and (say) + 18 volts. Ideally each picture element, the region of the liquid crystal layer lying between a particular electrode element 13 and the counter-electrode 21, is driven via the column conductors 8 by a square wave which is either in phase with the waveform applied to the counter-electrode 21, or 180° out of phase. These square waves should have the same amplitude and operate between the same pair of voltage levels. Under these circumstances electrode elements 13a that are driven in phase with the counter-electrode 21 develop no voltage across their associated picture elements which are thus OFF; while those electrode elements 13b that are driven 180° out of phase are subjected to an 18 volt potential difference whose polarity changes every 20 mS (for 25 Hz), and are ON. This arrangement is used to maximize the r.m.s. drive to ON elements for a given voltage capability of the FET devices because it is the r.m.s. voltage that determines the liquid crystal response. The operating voltage can be dropped by reducing the proportion of chiral additive in the liquid crystal layer, but this has the disadvantage of reducing the display contrast because the longer pitch of the layer in the cholesteric OFF state produces less absorption of color.

In actual practice the display cell is operated with all the FET's held in their OFF state except while they are being addressed. All the FET's of a row are addressed simultaneously by temporarily turning ON the gates of that row while the appropriate potentials, 0 or 18 volts, are applied to the column conductors 8. The individual rows are addressed in sequence at a rate that refreshes the potential appearing on each electrode element 13 before it has decayed too much. This addressing of the electrode elements 13 on a time-sharing basis means that it is not possible for their polarities all to be reversed exactly in phase with the polarity reversal of the counter-electrode 21. Only one row can make its polarity reversal exactly in phase with any particular polarity reversal of the counter-electrode 21. The more remote rows must make their polarity reversals at times progressively further out of phase, and therefore different rows see the "wrong" signals for different proportions of time. For the picture elements in at least one row this cannot be less than approximately half the frame time (the time taken to scan all the rows once). Thus if the scanning of the rows proceeds consecutively from top to bottom the polarity reversal of the counter-electrode can be arranged to be coincident with the addressing of the middle row. Under these circumstances the upper half of the display is addressed with signals appropriate for the counter-electrode polarity after reversal, while the bottom half is addressed with signals appropriate for the counter-electrode polarity before reversal. All the rows in the top half therefore see the "wrong" signal from their individual addressing times up to the time of the polarity reversal of the counter-electrode, while the rows in the bottom half see the wrong signal from the time of the polarity reversal of the counter-electrode up to their individual addressing times. Clearly the "worst" cases are the picture elements of the top and bottom rows, each of which see a "wrong" signal for approximately half a frame time. Elements in intermediate rows see a shorter duration of "wrong" signal which is in proportion to their distance from the center row.

The proportion of "wrong" signal time to total time can be reduced by increasing the number of frame scans made between consecutive polarity reversals of the counter-electrode. However there is a limit to the improvement that can be effected in this way. This is set on the one hand by the minimum frequency required for polarity reversal of the counter-electrode 21, previously stated to be in the region of 25 Hz; and on the other hand by the maximum scan frequency, which is set by the number of rows and the minimum time required for addressing a row.

In a 40 by 40 picture element array it is typically found convenient to have in the region of five frame times between consecutive polarity reversals of the counter-electrode. By virtue of the "hysteresis" effects previously referred to, the reduction in r.m.s. signal applied to ON elements 13b consequent upon receipt of "wrong" signals for a proportion of the time produces a visually less significant effect than the effect produced by the complementary appearance of an unwanted r.m.s. applied to OFF elements 13a. It is this unwanted r.m.s. signal liable to occur on OFF elements in certain rows that needs to be reduced or eliminated. This is achieved by momentarily blanking the display for a short period commencing with each polarity reversal of the counter-electrode. This blanking involves simultaneously switching on all the FET's and setting the potentials of their electrode elements 13 equal to that of the new potential of the counter-electrode 21. This removes the unwanted r.m.s. signal from OFF picture elements 13a, but retains the unwanted reduction in r.m.s. signal applied to ON elements 13b, since ON elements 13b are thereby switched OFF at the polarity reversal and remain OFF until they are next addressed.

As explained earlier, different rows are re-addressed at different time intervals after the polarity reversal and hence see a different magnitude of reduction in r.m.s. signal. Where those differences are liable to produce a visually noticeable effect steps can be taken to share the difference between different rows by making the counter-electrode polarity reversal occur after a non-integral number of frame times. This is exemplified in the present instance by making the polarity reversal occur after each 216 row scans, which corresponds to 5-2/5 frame times. This means that the polarity reversal takes place at different times at five different rows which are spaced eight rows apart, and that the complete sequence is repeated every 27 frame times.

An estimate of the maximum difference in reduction of r.m.s. signal to ON elements can be made by considering row 1 and row 8, the "best" and worst cases, when the counter-electrode polarity reversal occurs at row 1. In one complete sequence of 5-2/5 frame times, that is, during each 27 frame times, row 1 is in the "wrong" state for the following fractions of a frame time 0, 24/40, 8/40, 32/40, and 16/40. This totals 2 frame times. The corresponding figures for row 8 are 7/40, 31/40, 15/40, 39/40, and 23/40, totalling 2-7/8 frame times. Bearing in mind that the response is to r.m.s. voltage the difference between "best" and "worst" cases is seen to be about 1.7%.

Figure 2:
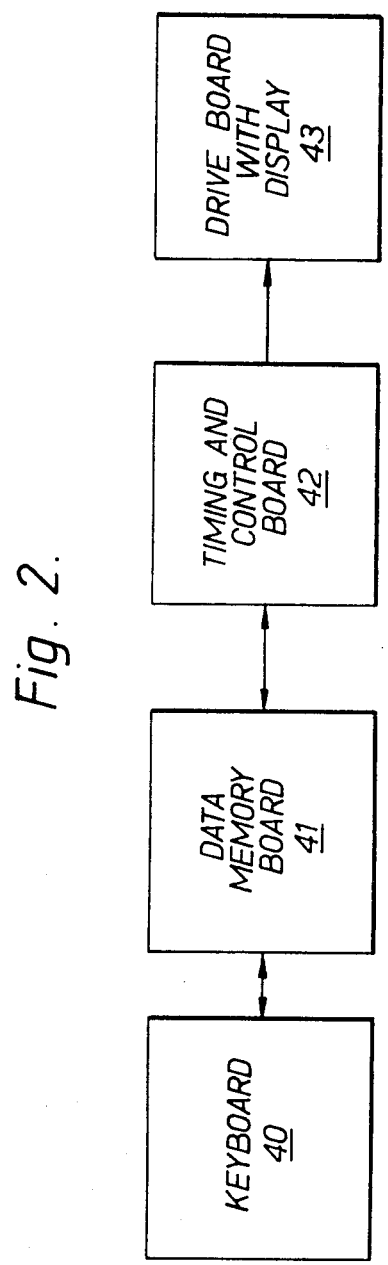
FIG. 2 is a block diagram of the display device drive circuitry.

A block diagram of the display drive circuitry is depicted in FIG. 2. A keyboard 40 is connected to a data memory board 41 which is in turn connected to a timing and control board 42 connected to a drive board 43 containing the display cell. The keyboard 40 codes the entered data into ASCII and transfers them to the data memory board 41. The timing and control board 42 generates the clock signal, the timing to scan the data on the memory board and the row scanning sequence. The timing and control board 42 transforms the stored data into serial form that is output to the drive board 43. In the drive board 43 separate serial codes are applied to two parallel out shift registers respectively controlling the rows and the columns via buffers which are held OFF while the data in the shift registers is being changed. During the main part of the frame scan the shift register associated with the drive to the rows has a single '1'. This is replaced with a full complement of '1's at each polarity reversal of the counter-electrode 21.

Figure 3:
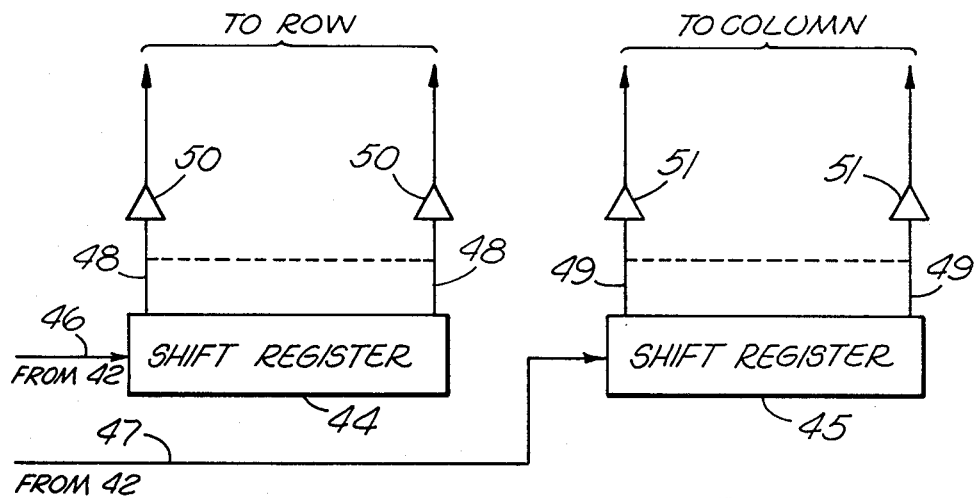
FIG. 3 is a circuit diagram of exemplary circuitry usable with the display device of FIGS. 1 and 2.

FIG. 3 shows two shift registers 44 and 45 which are provided on the board 43 and to which signals in serial form are supplied from the board 42 through respective lines 46 and 47. The shift registers 44 and 45 have respective parallel outputs 48 and 49 through which the momentary contents of the respective shift register 44 or 45 is supplied to respective buffers 50 or 51 at appropriate times. Then, the contents of the individual buffers 50 or 51 are supplied at the proper times to the respective rows or columns. For a 40×40 display, the shift register 44 will have 40 outputs 48, and the shift register 45 will have 40 outputs 49. During normal operation, that is, while the display is being painted or refreshed, binary "1" will appear only on a single one of outputs 48 at any given time, and the position will change during the respective frame to achieve the strobing of the rows. On the other hand, at the time of the polarity reversal of the counter-electrode 21, binary "1" will appear on each of the outputs 48 of the shift register 44, so that all of the FET's will be enabled, and the electrode elements 13 will be ready to have the potential set via the respective columns. During this time period of enablement of all of the FET's, the potentials appearing at all the outputs will be the same as the contemporaneous potential of the counter-electrode 21. Thus, at this time, all of the electrodes 13 will be at the same potential.

Figure 4:
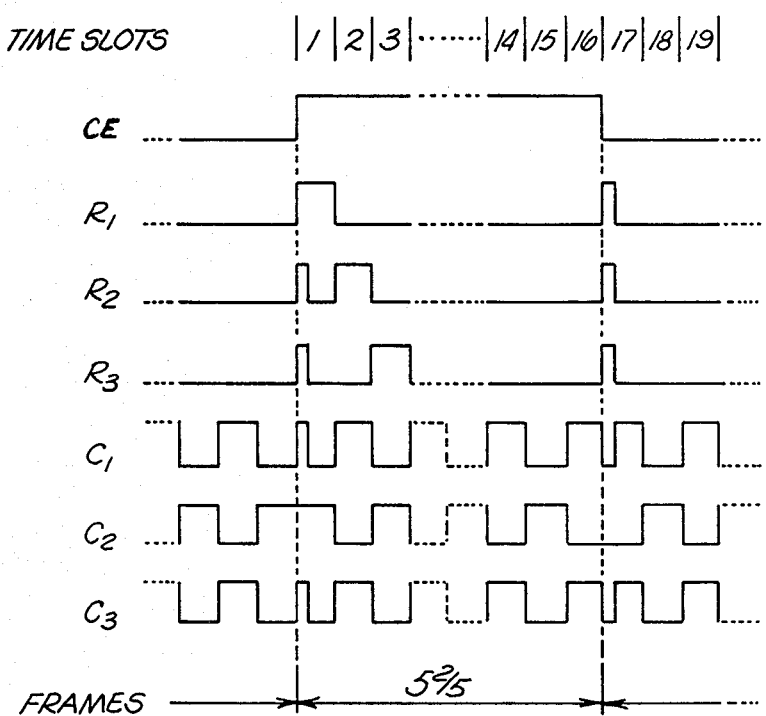
FIG. 4 is a timing diagram illustrating exemplary waveforms that may be used to display a checkerboard pattern.

For a specific example of the invention in use, reference is made to FIG. 4 which illustrates the timing of the various electrode waveforms usable to generate a checkerboard test pattern. At the time of the change in the potential or polarity of the counter-electrode, and only at this time, all of the electrode elements are simultaneously charged or discharged to bring their potentials to the same level as the new level of the counter-electrode potential, regardless in which rows the electrode elements are arranged. This, of course, presupposes that all of the gates of all of the electrode elements of all of the rows are temporarily open to permit the charging or discharging of such electrode elements. In FIG. 4, this is indicated for the respective rows $R_1$ to $R_3$ (only three of such rows being shown for the sake of simplicity) by having a temporary logic "1 " in the signal supplied to each of the rows $R_1$ to $R_3$ at the beginning of time slot 1 and then, 5-2/5 frames later, at the beginning of the time slot 17. This temporary logic "1", which occurs in addition to the normal logic "1" that achieves the sequential scanning or addressing of the rows unless obscured thereby, temporarily opens the gates of the electrode elements of all of the rows at the same time, which is immediately subsequent to the change in the potential level of the counter-electrode. Since all of the gates of all of the electrode elements of all of the rows are thus opened at this time, the electrode elements can be charged or discharged as need be to bring the potential level of all of the electrode elements of all of the rows to the new potential level of the counter-electrode at this time, and prior to the resumption of the normal scanning during which the electrode elements are supplied, row-by-row, with signals appropriate for creating the desired display, taking into account the then existing potential level of the counter-electrode.

There are also shown in FIG. 4 signals supplied to the electrode elements through the respective column conductors $C_1$ to $C_3$ (here again, only three of them have been shown for the sake of simplicity). The waveforms illustrated in FIG. 4 assume that the display to be created is that of a checkerboard pattern, that is, with ON and OFF picture elements alternating in the respective rows and columns. Hence, prior to the first shown counter-electrode potential level (at time slot 1 from logic "0" to logic "1") the logic "0's" alternate with logic "1's" in the signals supplied to the respective column conductors $C_1$ to $C_3$, with the logic "1's" for the odd-numbered columns occuring in odd-numbered time slots, and for the even-numbered columns occurring in even-numbered time slots. Since the counter-electrode potential level at this time is logic "0", the logic "1" at the electrode element will turn the associated picture element ON. Immediately after the counter-electrode polarity reversal in time slot 1, from logic "0" to logic "1", all of the gates are momentarily open (due to the presence of the aforementioned temporary logic "1's" in the row conductor signals $R_1$ to $R_3$). Simultaneously, logic "1's" are temporarily supplied to the column conductors $C_1$ to $C_3$. Since the counter-electrode CE is at this time at the logic "1" potential level, no potential differential will exist between the counter-electrode and any of the electrode elements at this time, so that all of the picture elements of the display device will be temporarily turned OFF, whether their desired state is ON or OFF. Thereafter, the normal scanning of the rows is resumed, and the column conductors are supplied with the signals appropriate for the creation of the desired display. Since the counter-electrode is now (after the level change) at the logic "1" level, the potential level needed for turning the respective picture element ON is a logic "0" at the associated electrode element. Hence, to create the aforementioned checkerboard pattern identical to the one displayed prior to the counter-electrode potential level change, the logic "0"s" will now occur in the odd-numbered time slots for the odd-numbered columns, and in the even-numbered time slots for the even-numbered columns. The sequential scanning involves the opening of the gates associated with the electrode elements of a particular row during its assigned time slot, by supplying a logic "1" to the respective row $R_1$ to $R_3$, so that the potential level then present at the respective column conductor $C_1$ to $C_3$ can reach the respective electrode element of the then activated row and either charge it or discharge it or leave it as before, depending on the circumstances. 5–2/5 frames later, the above-described operation is repeated, but in reverse, to achieve the same situation as existed before the first counter-electrode polarity reversal. Then, another 5–2/5 frames later, the above-described operation is repeated, and so on. Since the same conditions apply regardless of the change direction, it is not deemed to be necessary to elaborate on the conditions encountered during the reversal of the counter-electrode polarity from logic "1" to logic "0". Suffice it to say that the row conductors $R_1$ to $R_3$ are temporarily supplied with logic "1"s to open their gates, and that the column conductors $C_1$ to $C_3$ are temporarily supplied with logic "0"s at the time of the counter-electrode polarity reversal to bring the electrode elements of all rows simultaneously to the same potential level as the new counter-electrode potential level. Hence, once more, all of the picture elements will be turned OFF immediately following the counter-electrode potential level reversal, with the desired states thereof being restored during the following sequential scanning of the rows. Of course, since the gates of the electrode elements of all of the rows except that addressed during the time slot during which the counter-electrode phase or polarity reversal takes place are closed until the time of the regular scanning addressing thereof, the picture elements associated therewith will be in their OFF states until the respective row is addressed during the sequential scanning. Yet, as mentioned before, this is less disturbing than if the picture elements that should be OFF were ON. Basically, what happens is that the display is "repainted", starting from scratch, every 5–2/5 frames, without any erroneous display occurring during the "repainting".

The invention has been described by reference to a specific embodiment. Those skilled in the art will recognize that modifications other than those specifically mentioned can be made without departing from the spirit of the invention and the scope of the present invention is defined solely by the appended claims.

We claim:

1. A method of operating a matrix array display device having a set of electrode elements arranged in a matrix array on one side of a layer of display medium and a counter-electrode on the other, wherein each electrode element of the array is repetitively addressed via the gate of a semiconductor device accessed on a coordinate basis via row conductors, wherein the electrode elements of a row are simultaneously accessed and different rows are repetitively strobed so that they are sequentially accessed and the matrix elements thereby repetitively refreshed, wherein regions of the layer of display medium between the counter-electrode and selected electrode elements are rendered visually distinguishable from regions of the layer between the counter-electrode and the remaining electrode elements by the establishment of an r.m.s. potential difference exceeding a threshold value between the counter-electrode and the selected electrode elements while substantially no potential difference is maintained between the counter-electrode and the remaining electrode elements, wherein the potential difference between the counter-electrode and the selected electrode elements is periodically reversed by switching the potential of the counter-electrode between two levels and by subsequently switching the potentials of the selected electrode elements on accessing of the respective rows in substantial antiphase between substantially the same two levels, wherein said switching occurs at a repetition frequency providing a plurality of addressings of each electrode element within the duration of each potential level of the counter-electrode, and wherein only immediately each time the counter-electrode potential is switched all of the electrode elements of all rows are first simultaneously set to the same potential as the counter-electrode potential and thereafter normal strobing of the electrode elements is resumed.

2. A method of operating a display device as claimed in claim 1 wherein the potential of the counter-electrode is switched at regular intervals corresponding to a non-integral number of complete strobing of the array.

3. A method as claimed in claim 2 wherein the non-integral number can be expressed as a fraction whose divisor is a factor of the number of rows in the display device.

4. A method as claimed in claim 1 wherein the layer of display medium is a liquid crystal layer.

5. A method as claimed in claim 4 wherein the liquid crystal layer is a layer of cholesteric material incorporating a pleochroic dye and capable of being converted to a homeotropically aligned nematic state by the application of an alternating electric potential between one or more of the electrode elements and the counter-electrode.

6. A method as claimed in claim 1, 2, 3, 4 or 5 wherein the layer of display medium is confined on one side by a slice of semiconductor material and wherein said gates are the gates of FET's constructed in the semiconductor slice.

7. A matrix array display device having a set of electrode elements arranged in matrix array on one side of a layer of display medium and a counter-electrode on the other, wherein the electrode elements of the array are capable of being accessed on a coordinate basis via column conductors connected to the electrode elements via gates whose operation is controlled by signals applied to row conductors, wherein regions of the layer of display medium between the counter-electrode and any selection of electrode elements are capable of being rendered visually distinguishable from regions of the layer between the counter-electrode and the remaining electrode elements by the establishment of an r.m.s. potential difference exceeding a threshold value between the counter-electrode and the selected electrode elements while substantially no potential difference is maintained between the counter-electrode and the remaining electrode elements, which device is provided with drive circuitry adapted to address repetitively the electrode elements of the array on a time-sharing basis via their gates in such a way that the electrode elements of a row are simultaneously accessed and the different rows are repetitively strobed so that they are sequentially accessed and the matrix elements thereby repetitively refreshed, wherein the drive circuitry is adapted to reverse periodically the potential difference between the counter-electrode and the selected electrode elements by switching the potential of the counter-electrode between two levels and by subsequentially switching the potential of the selected electrode elements on accessing of the respective rows in substantial antiphase between substantially the same two levels, wherein said switching occurs at a repetition frequency providing a plurality of addressings of each electrode element within the duration of each potential level of the counter-electrode, and wherein the drive circuitry is adapted to momentarily interrupt the strobing only with the commencement of each change of potential of the counter-electrode and, during said interruption, to set simultaneously the potentials of all of the electrode elements of all rows to the potential of the counter-electrode before normal strobing of the electrode elements is resumed.

8. A matrix array display device as claimed in claim 7 wherein the drive circuitry is adapted to switch the potential of the counter-electrode at regular intervals corresponding to a non-integral number of complete strobings of the array.

9. A matrix array display device as claimed in claim 8 wherein said non-integral number can be expressed as a fraction whose divisor is a factor of the number of rows in the display device.

10. A matrix array display device as claimed in claim 7, 8, or 9 wherein the layer of display medium is a liquid crystal layer.

11. A matrix array display device as claimed in claim 7 wherein the liquid crystal layer is a layer of cholesteric material incorporating a pleochroic dye and capable of being converted to a homeotropically aligned nematic state by the application of an alternating electric potential between one or more of the electrode elements and the counter-electrode.

12. A matrix array display device as claimed in claim 7, 8, 9 or 11 wherein the layer of display medium is confined on one side by a slice of semiconductor material and wherein the elements are accessed via gates formed by FET's constructed in the semiconductor slice.

* * * * *